(12) United States Patent
Agrawal et al.

(10) Patent No.: US 10,956,122 B1
(45) Date of Patent: Mar. 23, 2021

(54) ELECTRONIC DEVICE THAT UTILIZES EYE POSITION DETECTION FOR AUDIO ADJUSTMENT

(71) Applicant: MOTOROLA MOBILITY LLC, Chicago, IL (US)

(72) Inventors: Amit Kumar Agrawal, Bangalore (IN); Olivier Meirhaeghe, Lincolnshire, IL (US); Alexandre Neves Creto, Sao Paulo (BR); Lucie Corinne Evelyne Papelier, Shenzhen (CN)

(73) Assignee: Motorola Mobility LLC, Chicago, IL (US)

(*) Notice: Subject to any disclaimer, the term of this patent is extended or adjusted under 35 U.S.C. 154(b) by 0 days.

(21) Appl. No.: 16/837,771

(22) Filed: Apr. 1, 2020

(51) Int. Cl.
*G06F 3/16* (2006.01)
*H04S 7/00* (2006.01)
*G06K 9/00* (2006.01)
*G06F 3/01* (2006.01)

(52) U.S. Cl.
CPC ............ *G06F 3/165* (2013.01); *G06F 3/013* (2013.01); *G06K 9/00275* (2013.01); *G06K 9/00281* (2013.01); *H04S 7/303* (2013.01)

(58) Field of Classification Search
CPC ........ G06F 1/3231; G06F 3/165; G06F 3/013; G06K 9/00275; G06K 9/00281; G06K 9/00248; G06K 9/00221; G06K 9/00268; G06K 9/00214; G02B 27/0093; G02B 2027/0138; H04R 2499/11; H04R 3/12; H04R 2460/07; H04R 2430/20; H04R 5/02; H04R 2499/15; H04R 2430/23; H04R 25/407; H04R 25/40; H04R 1/32; H04S 7/303; H04S 7/302; H04S 2400/01; H04S 2420/01; H04S 1/00
USPC ............................................. 381/1, 306, 303
See application file for complete search history.

(56) References Cited

U.S. PATENT DOCUMENTS

| | | | |
|---|---|---|---|
| 2011/0211035 A1* | 9/2011 | Ota ..................... | H04S 7/303 348/14.01 |
| 2012/0195447 A1* | 8/2012 | Hiruma ................ | H04S 7/303 381/306 |
| 2015/0036847 A1* | 2/2015 | Donaldson ........... | H04S 7/303 381/303 |
| 2015/0285641 A1* | 10/2015 | Nielsen ............... | G01C 21/3629 381/302 |

\* cited by examiner

*Primary Examiner* — Norman Yu
(74) *Attorney, Agent, or Firm* — Yudell Isidore PLLC

(57) ABSTRACT

An electronic device, method, and computer program product provide audio adjustment. The electronic device receives an image captured by an image capturing device and identifies a face within the image. A controller of the electronic device determines an eye pointing direction normal to the face and relative to an orientation of the electronic device. The controller determines respective distances from first and the second audio output devices of the electronic device to at least one of a right and a left ear of the face based on the eye pointing direction. The controller adjusts respective acoustic output levels of the first and the second audio output devices to make an audio adjustment in relation to, and to compensate for a difference in, the respective distances from the first and the second audio output devices to the at least one of the right and the left ears of the face.

18 Claims, 9 Drawing Sheets

ELECTRONIC DEVICE THAT UTILIZES EYE POSITION DETECTION FOR AUDIO ADJUSTMENT

1. Technical Field

The present disclosure relates generally to electronic devices, and in particular to electronic devices capable of producing audio output on multiple audio output devices.

2. Description of the Related Art

Electronic devices are frequently used to playback media content such as music, audio/voice recordings, and videos that include audio. Although headphones are an option, users often rely on the one or more broadcast speakers of the electronic devices to play the audio. As a personal user device, the device's speakers are intended to deliver audio to a user who is holding the device or is otherwise positioned close to the electronic device. Audio content can include left and right stereo channels that are intended to be primary heard respectively by just one ear of the user. Video media content can further reinforce video imagery with stereo audio that corresponds to the position or direction of movement. For example, the image and sound of vehicle can move from left to right.

Electronic devices that are portable are generally rectangular rather than square. A display of the rectangular electronic device presents content in portrait or landscape mode. These modes can be user selected, preset based on a design of a user interface, determined by the content being playback, or automatically selected based on whether the electronic device is upright in a portrait or landscape orientation. Although the display provides orientation options, the audio capabilities are limited. Many electronic devices have one output speaker that does not change amplitude setting, even if the user turns or moves closer or farther away. Even with two output speakers that can also support stereo audio, the ability for correctly oriented right and left stereo channels is lost if the electronic device is oriented with the speakers on the top and bottom or laid horizontally. In addition, the audio amplitude levels are manually set. User experience is not optimum unless the user is properly positioned relative to the speakers. Also, if the user's head is not aligned with the electronic device, the audio is not received equally or at the intended stereo (or duplex) output level by both ears of the user.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
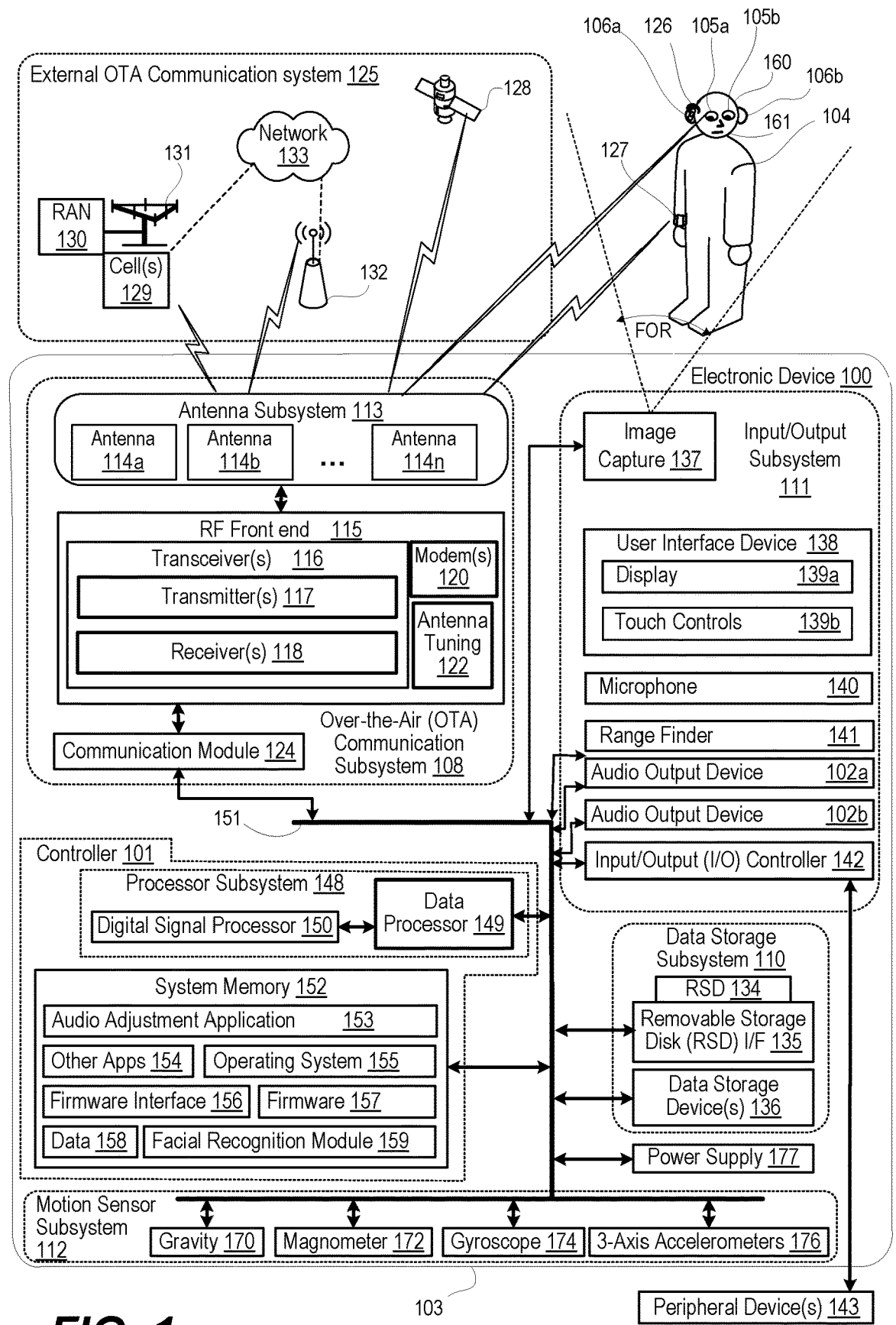
FIG. 1 is a functional block diagram of an electronic device that adjusts audio produced by more than one audio output device based on user/consumer orientation, according to one or more embodiments.

According to aspects of the present disclosure, an electronic device, a method, and a computer program product provide audio adjustment for enhancement of the quality/balance of received audio by a consumer. The electronic device receives an image captured by an image capturing device and identifies a face within the image. A controller of the electronic device determines an eye pointing direction normal to the face and relative to an orientation of the electronic device. The controller determines respective distances from first and the second audio output devices of the electronic device to at least one of a right and a left ear of the face based on the eye pointing direction. The controller adjusts respective acoustic output levels of the first and the second audio output devices to make an audio adjustment in relation to, and to compensate for a difference in, the respective distances from the first and the second audio output devices to the at least one of the right and the left ears of the face in order to enhance the quality of the received audio by the consumer(s).

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention.

The description of the illustrative embodiments can be read in conjunction with the accompanying figures. Embodiments incorporating teachings of the present disclosure are shown and described with respect to the figures presented herein.

FIG. 1 is a functional block diagram of example electronic device 100 in an operating environment within which the features of the present disclosure are advantageously implemented. In the illustrated embodiment, electronic device 100 has controller 101 that adjusts audio output of audio output devices 102a-b that are spaced on housing 103 of electronic device 100. Controller 101 performs facial recognition of person 104 to determine a straight ahead pointing direction of right and left eyes 105a-b relative to orientation of electronic device 100. Controller 101 adjusts at least audio amplitude of respective audio output device 102a-b in relation to corresponding distances to right and left ears 106a-b of person 104, based on the relative pointing direction of right and left eyes 105a-b. Electronic device 100 can be one of a host of different types of devices, including but not limited to, a mobile cellular phone, satellite phone, or smart-phone, a laptop, a net-book, an ultra-book, a networked smart watch or networked sports/exercise watch, and/or a tablet computing device or similar device that can include wireless communication functionality. As a device supporting wireless communication, electronic device 100 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem. These various devices all provide and/or include the necessary hardware and software to support the various wireless or wired communication functions as part of a communication system. Electronic device 100 can be intended to be portable, hand-held, wearable, detachable, positioned in a fixed location, or mounted to a movable vehicle.

Referring now to the specific component makeup and the associated functionality of the presented components. In one or more embodiments, electronic device 100 includes over-the-air (OTA) communication subsystem 108, data storage subsystem 110, input/output subsystem 111, and motion sensor subsystem 112 that are managed by controller 101. OTA communication subsystem 108 includes antenna subsystem 113 having antenna elements 114a-114n. OTA communication subsystem 108 includes frontend 115 having transceiver(s) 116 that includes transmitter(s) 117 and receiver(s) 118. Frontend 115 further includes modem(s) 120 and antenna tuning circuitry 122. OTA communication subsystem 108 includes communication module 124. OTA communication subsystem 108 communicates with external OTA communication system 125. External OTA communication system 125 can include devices such as wireless headset 126 and smart watch 127. External communication system 125 can include global positioning system (GPS) satellites 128, cell(s) 129 of RANs 130 that transmit and receive via radio tower 131, node 132, and networks 133.

Data storage subsystem 110 of electronic device 100 includes removable storage device (RSD) 134, RSD interface (I/F) 135, and data storage device(s) 136. In one or more embodiments, removable storage device (RSD) 134, which is received in RSD interface 135, is a computer program product or computer readable storage device, which can be referred to as non-transitory. RSD 134 can be accessed by controller 101 to provision electronic device 100 with program code. When executed by controller 101, the program code provides the functionality described herein within electronic device 100. I/O subsystem 111 includes image capturing device 137. I/O subsystem 111 includes user interface device 138 having display 139a and touch controls 139b such as including one or more of a touch screen, keys, and buttons. I/O subsystem 111 includes microphone 140, range finder 141, and audio output device 102a-b. I/O subsystem 111 also includes I/O controller 142, which connects to peripheral devices 143 external to housing 103 of electronic device 100. Audio output devices 102a-b provide audio output, including audio playback and alerts.

Controller 101 includes processor subsystem 148, which includes one or more central processing units (CPUs) ("data processor") 149 that are communicatively coupled, via system interlink 151, to system memory 152. Processor subsystem 148 can include one or more digital signal processors 150 that are integrated with data processor 149 or are communicatively coupled, via system interlink 151, to data processor 149. System memory 152 includes applications such as audio adjustment application 153 and other application(s) 154. System memory 152 further includes operating system 155, firmware interface (I/F) 156, such as basic input/output system (BIOS) or Uniform Extensible Firmware Interface (UEFI), and other firmware 157. System memory 152 includes data 158 used by audio adjustment application 153 and other applications 154. Facial recognition module 159 can also reside at least in part in system memory 152.

Processor subsystem 148 of controller 101 executes program code to provide operating functionality of electronic device 100. These software and/or firmware modules have varying functionality when their corresponding program code is executed by processor subsystem 148 or secondary processing devices within electronic device 100. Processor subsystem 148 of controller 101 can execute program code of audio adjustment application 153 to provide audio adjustment for person 104. The adjustment is to replicate, if possible, the user experience of being positioned directly facing the electronic device 100. The audio volume and timing to both ears is proportional to the original audio signal. In one or more embodiments, controller 101 enables electronic device 100 to adjust amplitude and/or time delay phase of audio output devices 102a-b to provide a consistent user experience to person 104 as the orientation and distance of head 160 of person 104 changes relative to electronic device 100. Controller 101 controls the various functions and/or operations of electronic device 100. These functions and/or operations include, but are not limited to including, application data processing, communication with other electronic devices, navigation tasks, and signal processing. In one or more alternate embodiments, electronic device 100 may use hardware component equivalents for application data processing and signal processing. For example, electronic device 100 may use special purpose hardware, dedicated processors, general purpose computers, microprocessor-based computers, micro-controllers, optical computers, analog computers, dedicated processors and/or dedicated hard wired logic.

In one or more embodiments, controller 101 of electronic device 100 is communicatively coupled via system interlink 151 to OTA communication subsystem 108, data storage subsystem 110, input/output subsystem 111, and motion sensor subsystem 112. System interlink 151 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (interlink 151) are illustrated in FIG. 1, it is to be understood that more, fewer, or different interconnections may be present in other embodiments.

Communication module 124 of OTA communication subsystem 108 operates in baseband frequency range to encode data for transmission and decode received data, according to a communication protocol. Modem(s) 120 modulate baseband encoded data from communication module 124 onto a carrier signal to provide a transmit signal that is amplified by transmitter(s) 117. Modem(s) 120 demodulates the received signal from cell(s) 129 or node 132 detected by antenna subsystem 113. The received signal is amplified and filtered by receiver(s) 118, which demodulate received encoded data from a received carrier signal. Antenna tuning circuitry 122 adjusts antenna impedance of antenna subsystem 113. Antenna tuning circuitry 122 improves antenna efficiency at desired transmit or receive frequencies of transmitter(s) 117 and receiver(s) 118, respectively, within transceiver(s) 116. Antenna tuning circuitry 122 is electrically coupled to antenna subsystem 113 and compensates for any lossy dielectric effect of being proximate to person 104. In one or more embodiments, antenna subsystem 113 includes multiple antenna elements 114a-114n that are individually tuned to selected RF bands to support different RF communication bands and protocols. Antenna elements 114a-114n can be used in combination for multiple input multiple output (MIMO) operation for beam steering and spatial diversity.

In one or more embodiments, controller 101, via OTA communication subsystem 108, performs multiple types of OTA communication with external OTA communication system 125. OTA communication subsystem 108 can communicate via Bluetooth connection with one or more personal access network (PAN) devices, such as wireless headset 126 and smart watch 127. Communication via Bluetooth connection includes both transmission and reception via a Bluetooth transceiver device. In one or more embodiments, OTA communication subsystem 108 communicates with one or more locally networked devices via a wireless local area network (WLAN) link provided by node 132. Node 132 is connected to wide area network 133, such as the Internet. In one or more embodiments, OTA communication subsystem 108 communicates with GPS satellites 128 to obtain geospatial location information. In one or more embodiments, OTA communication subsystem 108 communicates with RANs 130 having respective base stations (B Ss) or cells 129. RANs 130 are a part of a wireless wide area network (WWAN) that is connected to wide area network 133.

Data storage subsystem 110 provides nonvolatile storage that is accessible by controller 101. For example, data storage subsystem 110 can provide a large selection of other applications 154 that can be loaded into system memory 152. In one or more embodiments, local data storage device (s) 136 includes hard disk drives (HDDs), optical disk drives, solid state drives (SSDs), etc.

I/O subsystem 111 includes external and embedded input and output devices. Image capturing device 137, such as an optical or infrared camera, can capture an image of face 161 of person 104 and/or other image data and can detect a gesture made by person 104. Image capturing device 137 generates still images and video. In one or more embodiments, images are taken by image capturing device 137 from a field of regard (FOR) that is sufficient for facial recognition module 159 to detect face 161 of person 104 that is within an angle and distance to be able to humanly hear audio output from audio output devices 102a-b. FOR is the total area that can be captured by a movable sensor. Field of view (FOV) is the angular cone perceivable by the sensor (i.e., image capturing device 137) at a particular time instant.

Microphone 140 receives user audible inputs. Range finder 141 emits a waveform of energy, such as acoustic, infrared, RF, etc., whose time of flight is used to measure distance to a reflecting object. In one or more embodiments, I/O controller 142 connects to one or more peripheral devices 143 that can include/provide additional I/O functionality. I/O controller 142 can also interface to a wired local access network (LAN) (not shown).

Axes-based motion sensor subsystem 112 includes one or more sensors that individually, or in combination, indicate orientation of electronic device 100. In one or more embodiments, gravity sensor 170 can be used to measure relative orientation with respect to the Earth's gravitational field. Magnetometer 172 is configured to measure strength and direction of a magnetic field in space that indicate direction relative to the magnetic geographic cardinal coordinates north, east, south and west. Gyroscope 174 is configured to generate and provide sensor data that indicates orientation of electronic device 100 along the three X-Y-Z axes based on rotation or angular momentum of electronic device 100 around the multiple axes. Three-axis accelerometer 176 is configured to generate and provide sensor data that indicates acceleration that electronic device 100 is experiencing relative to freefall, which can be used to determine orientation of electronic device 100 along the three axes, based on linear motion and gravity. Gravity sensor 170, magnetometer 172, gyroscope 174, and accelerometer 176 can be used alone or in combination to determine the relative orientation of electronic device 100 in space, including azimuth, pitch, and roll with respect to magnetic north and with respect to the horizontal and vertical axes relative to the direction of gravity. Electronic device 100 distributes electrical power from power supply 177, such as a battery for mobile use or alternating current-direct current (AC-DC) converter for stationary use.

Figure 2:
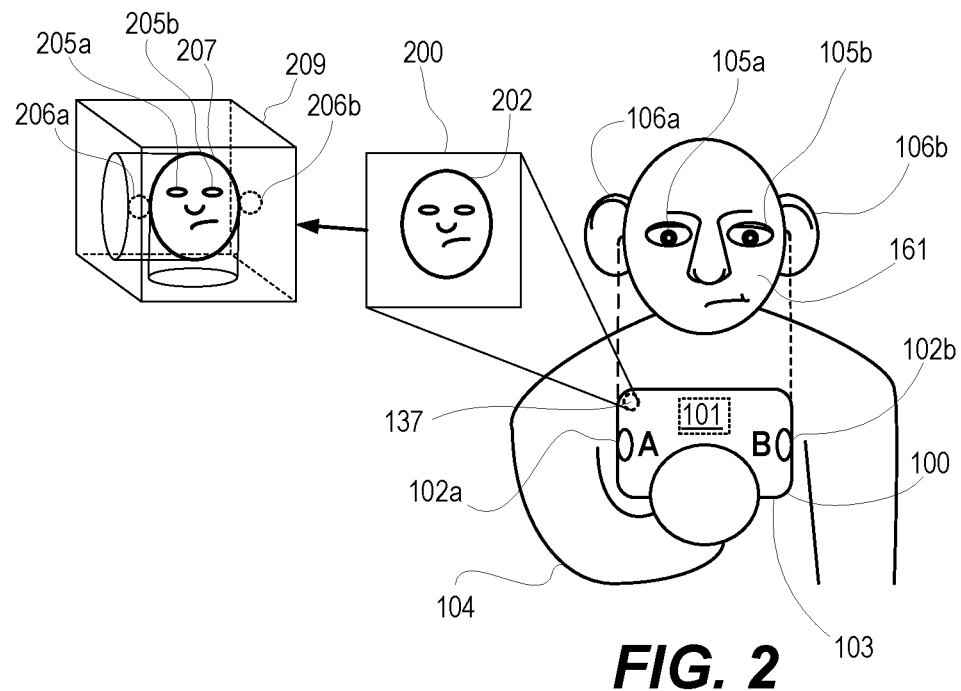
FIG. 2 is a front view of a person holding an example electronic device in landscape orientation directly in front of the person's face, according to one or more embodiments.
Figure 3:
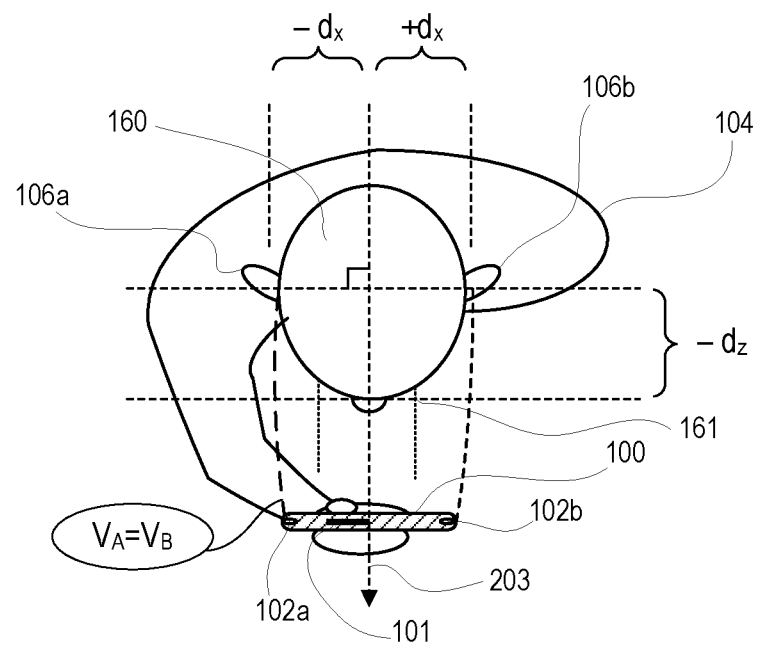
FIG. 3 is top view of the person holding the example electronic device in landscape orientation directly in front of the person's face, according to one or more embodiments.

FIG. 2 depicts a front view of example electronic device 100 having audio output devices 102a-b centered on opposite short sides of rectangular housing 103. Person 104 holds electronic device 100 in landscape orientation directly in front of face 161 of person 104. FIG. 3 is top view of person 104 holding example electronic device 100 in landscape orientation directly in front alignment with face 161 of person 104. With reference to FIG. 2, audio output device 102a is closer to right ear 106a than left ear 106b. Audio output device 102b is closer to left ear 106b than right ear 106a. In the illustration of FIG. 2, audio output devices 102a-b are equidistant to right and left ears 106a-b, respectively. Image capturing device 137 obtains image 200 that includes identified face 202. Controller 101 determines eye direction 203 (FIG. 3) based on position of imaged eyes 205a b on identified face 202 in image 200. Eye direction 203 refers to straight ahead viewing and not actual pupil direction. Controller 101 projects the position of identified face 202 including identified right and left eyes 205a-b to identified head 207 in three-dimensional space 209. In one or more embodiments, the distance of facial features to electronic device 100 can be determined based on one or more of: (i) the size of the facial features in image 200 scaled to default sizes; and (ii) distance information from range finder 141 (FIG. 1). Position of right and left ears 106a-b of person 104 can be detected within the image 200 or estimated within three-dimensional space 209 based a preset offset from identified face 202. In FIG. 3, person 104 has an actual x,y,z offset of right and left ears 106a-b on head 160 from face 161 respectively of $(-d_x, 0, -d_z)$ and $(+d_x, 0, -d_z)$. Controller 101 is provisioned with similar or identical offset information. In FIG. 2, three-dimensional coordinates are determined for identified right and left ears 206a-b. With this information, controller 101 determines that audio output devices 102a-b are equidistant to right and left ears 106a-b, respectively. In relation to this distance, controller performs audio adjustment by setting volume levels for audio output devices 102a-b to be the same ($V_A = V_B$).

Figure 4:
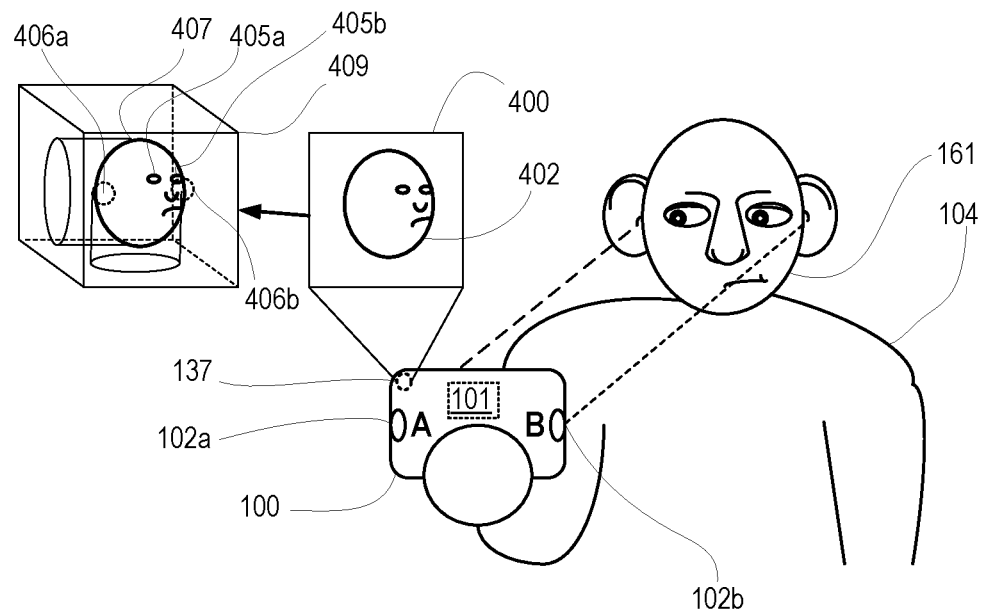
FIG. 4 is a front view of the person holding the example electronic device in landscape orientation to the right of the person's face, according to one or more embodiments.
Figure 5:
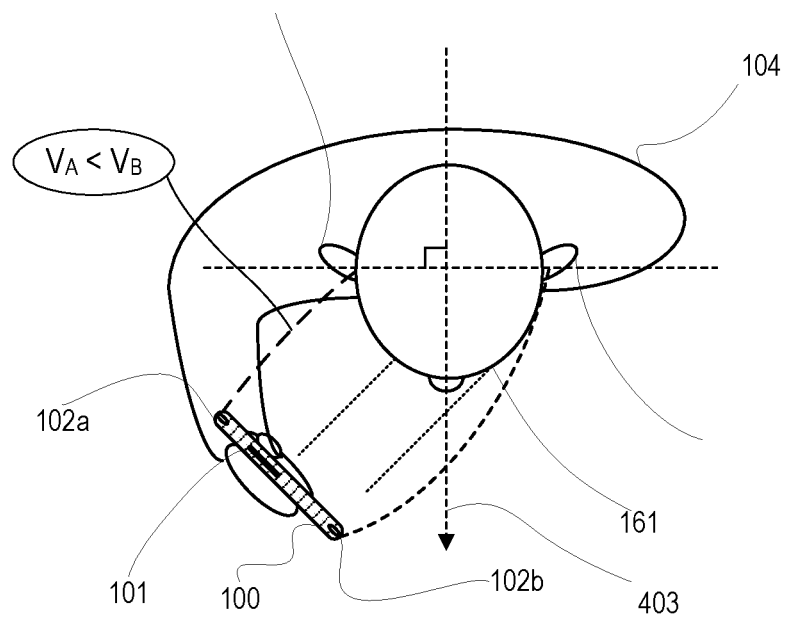
FIG. 5 is top view of the person holding the example electronic device in landscape orientation to the right of the person's face, according to one or more embodiments.

FIG. 4 depicts a front view of person 104 holding example electronic device 100 in landscape orientation to the right of face 161 of person 104. FIG. 5 is top view of person 104 holding example electronic device 100 in landscape orientation to the right of face 161 of person 104. In FIG. 4, image capturing device 137 obtains image 400 that includes identified face 402. Controller 101 determines eye direction 403 (FIG. 5) based on position of imaged eyes 405a-b on identified face 402 in image 400. Controller 101 projects the position of identified face 402 including identified right and left eyes 405a-b and right and left ears 406a-b to identified head 407 in three-dimensional space 409. Based on this information, in FIG. 5, controller 101 determines that right audio output device 102a is closer to right ear 106a than left audio output device 102b is to left ear 106b. In relation to the distances, controller 101 performs audio adjustment by having right audio volume ($V_A$) of right audio output device 102a be less than left audio volume ($V_B$) of left audio output device 102b. For example, the volume adjustment can be based on the theoretically-based mathematical formula for sound intensity from a point source. The sound intensity will obey the inverse square law if there are no reflections or reverberation. The sound pressure level (SPL) decreases by half, or −6 dB, with doubling of the distance. The volume adjustments compensate for these changes in sound intensity.

Figure 6:
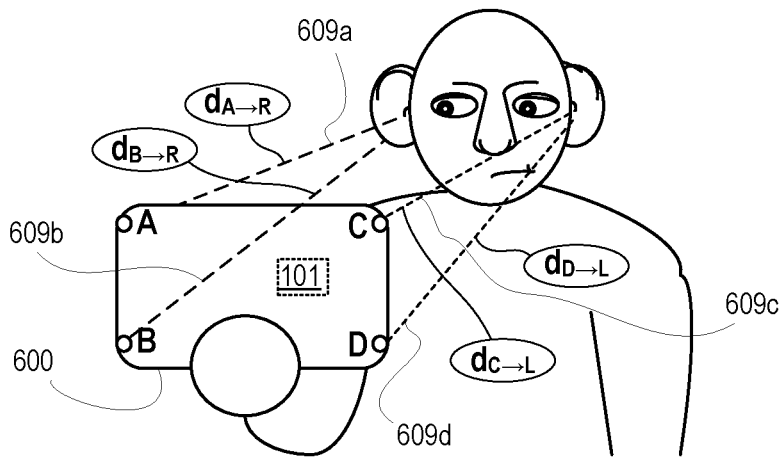
FIG. 6 is a front view of an electronic device in landscape orientation and which adjusts audio produced by four audio output devices based on detected user/consumer orientation, according to one or more embodiments.

FIG. 6 depicts a front view of example electronic device 600 held by person 104 in landscape orientation to the right of face 161 of person 104. Electronic device 600 can include identical or similar components as described for electronic device 100 (FIG. 1). Electronic device 600 has rectangular housing 603 with four (4) audio output devices 602a-d spaced apart at respective corners. In responses to detecting orientation of audio output devices 602a-d relative to person 104, controller 101 assigns audio output devices 602a-d such that: (i) a top right audio output devices 602a is the right channel tweeter; (ii) a bottom right audio output devices 602a is the right channel woofer; (iii) a top left audio output devices 602c is the left channel tweeter; and (iv) a bottom left audio output devices 602d is the left channel woofer. Based on image(s) received from image capturing device 137, controller 101 determines distance of audio output devices 602a-d to ears 106a-b of person 104. In relation to, and to compensate for, the difference in distances, controller 101 performs audio adjustment of audio outputs of audio output devices 602a-d. Controller 101 adjusts: (i) audio output 609a from audio output device 602a to right ear 106a over a distance $d_{A \to R}$; (ii) audio output 609b from audio output device 602b to right ear 106a over a distance $d_{B \to R}$; (iii) audio output 609c from audio output device 602c to left ear 106b over a distance $d_{C \to L}$; and (iv) audio output 609d from audio output device 602d to left ear 106b over a distance $d_{D \to L}$. The distances from longest to shortest are: (i) $d_{B \to R}$; (ii) $d_{D \to L}$; (iii) $d_{A \to R}$; and (iv) $d_{C \to L}$. The differences in respective distances of audio outputs 609a-d result in different sound intensities and timing from origination at electronic device 600 to termination at corresponding ear 106a-b. In particular, increased distance results in lower sound intensity and greater delay. Controller 101 adjusts audio outputs 609a-d to compensate for the distance-related changes to sound intensity and timing.

Figure 7:
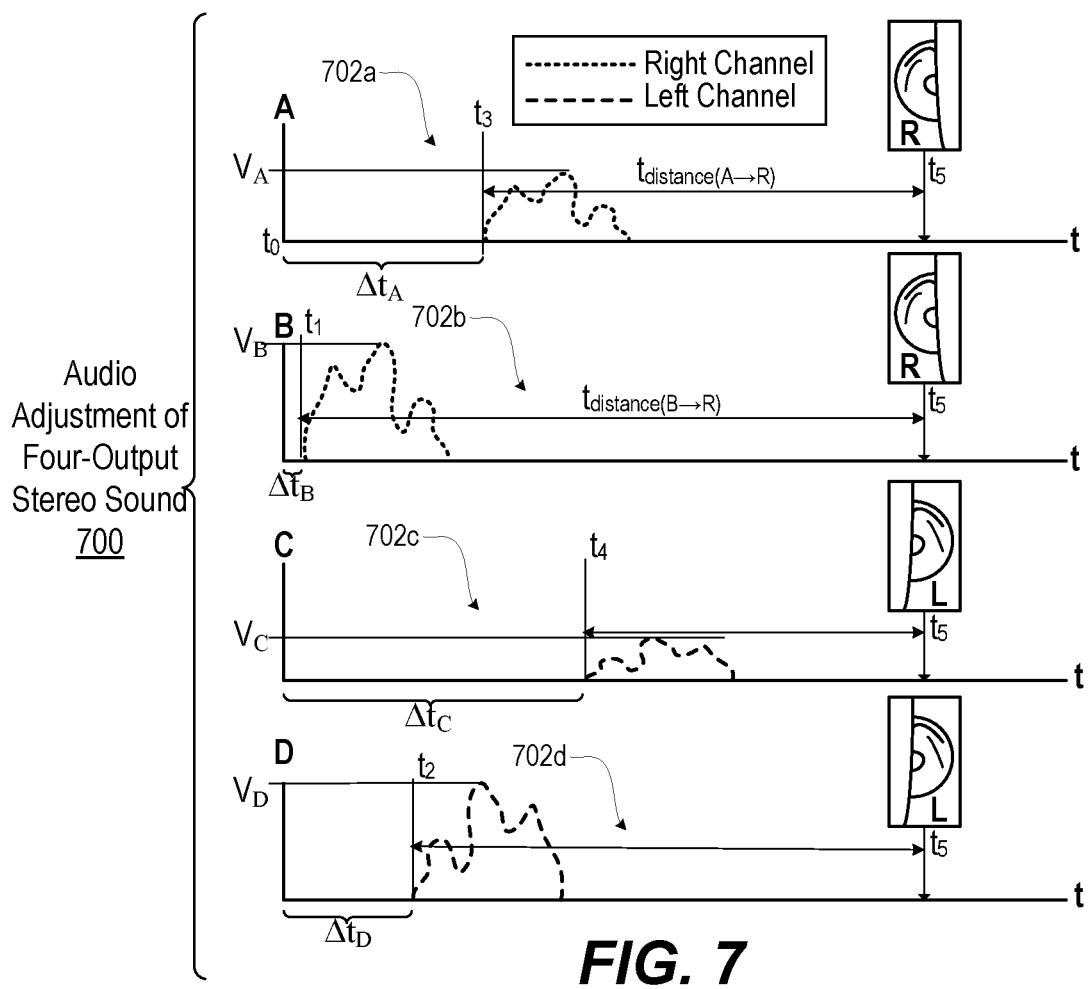
FIG. 7 is a composite graphical plot of adjusted audio for stereo sound by the electronic device of FIG. 6, according to one or more embodiments.

FIG. 7 depicts composite graphical plot 700 of four output plots 702a-d for stereo sound by electronic device 600 (FIG. 6). Each output plot 702a-d corresponds respectively to audio outputs 609a-d (FIG. 6) as adjusted by controller 101 (FIG. 6). Four output plots 702a-d depict audio adjustments of each audio output audio outputs 609a-d (FIG. 6) that that are made to enhance audio quality/balance as perceived by person 104 (FIG. 6). The audio adjustment includes time shifts and audio volume adjustments in relation to the different distances that the stereo sound travels to the person's ear. Longer distances need a relatively higher sound intensity than a shorter distance. Shorter distances need a relatively longer delay than a longer distance. Output plot 702a represents audio output of right channel stereo from audio output device 602a to right ear 106a (FIG. 6) over a distance $d_{A \to R}$. Distance $d_{A \to R}$ is the third longest distance of the four audio output devices 602a-d (FIG. 6) from the person's ear. The audio adjustment includes increasing audio volume ($V_B$) to the third highest level relative to the other three audio output devices 602a, c, d (FIG. 6) in relation to, and to compensate for, the distance $d_{A \to R}$. The audio adjustment includes delaying the audio output the third shortest amount to time $t_3$ relative to the audio output of the other three audio output devices 602b-d (FIG. 6). The delay is to achieve simultaneous arrival at ears 106a-b of person 104 (FIG. 6). Output plot 702b represents audio output of right channel stereo from audio output device 602b to right ear 106a (FIG. 6) over a distance $d_{B \to R}$. Distance $d_{B \to R}$ is the longest of the four audio output devices 602a-d (FIG. 6). The audio adjustment includes increasing audio volume ($V_B$) to the highest level relative to the volume of the other three audio output devices 602a, c, d (FIG. 6) in relation to, and to compensate for, the distance $d_{B \to R}$. The audio adjustment includes delaying the audio output the shortest amount to time $t_1$ relative to the audio output of the other three audio output devices 602a, c, and d (FIG. 6). Output plot 702c represents audio output of left channel stereo from audio output device 602c to left ear 106b (FIG. 6) over a distance $d_{C \to L}$. Distance $d_{C \to L}$ is the shortest of the four audio output devices 602a-d (FIG. 6). In one embodiment, the shortest delay can be zero (0) delay. The audio volume ($V_C$) is the lowest level relative to the audio volume of other three audio output devices 602a, b, d (FIG. 6) in relation to, and to compensate for, the distance $d_{C \to L}$. The audio adjustment includes delaying the audio output the longest amount to time $t_4$ relative to the audio output of the other three audio output devices 602a, b, d (FIG. 6) because the distance to left ear 106b is the shortest output device-to-ear distance. Output plot 702d represents audio output of left channel stereo from audio output device 602d to left ear 106b (FIG. 6) over a distance $d_{D \to L}$. Distance $d_{D \to L}$ is the second longest distance of the four audio output devices 602a-d (FIG. 6). The audio adjustment includes increasing audio volume (VD) to the second highest level relative to the other three audio output devices 602a-c (FIG. 6) in relation to, and to compensate for, the distance $d_{D \to L}$. The audio adjustment includes delaying the audio output the second longest amount to time $t_2$ relative to the other three audio output devices 602a-c (FIG. 6).

Figure 8:
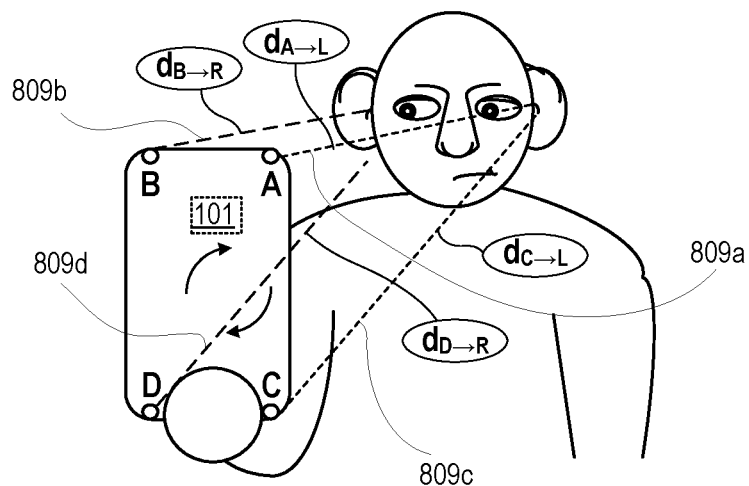
FIG. 8 is a front view of the electronic device in portrait orientation that adjusts audio produced by four audio output devices, according to one or more embodiments.

FIG. 8 depicts a front view of example electronic device 600 held by person 104 in portrait orientation to the right of face 161 of person 104. Audio output devices 602a-d are spaced apart at respective corners. In responses to detecting orientation of audio output devices 602a-d relative to person 104, controller 101 assigns audio output devices 602a-d such that: (i) a top right audio output devices 602b is the right channel tweeter; (ii) a bottom right audio output devices 602d is the right channel woofer; (iii) a top left audio output devices 602a is the left channel tweeter; and (iv) a bottom left audio output devices 602c is the left channel woofer. Controller 101 determines distance of audio output devices 602a-d to ears 106a-b of person 104. In relation to, and to compensate for, the difference in distances, controller 101 performs audio adjustments of both timing and audio volume so that respective audio outputs of audio output devices 602a-d arrives at ears 106a-b simultaneously, with equal volume level, as described below for FIG. 9. Controller 101 adjusts: (i) audio output 809a from audio output device 802a to left ear 106b over a distance $d_{A \to L}$; (ii) audio output 809b from audio output device 802b to right ear 106a over a distance $d_{B \to R}$; (iii) audio output 809c from audio output device 802c to left ear 106b over a distance $d_{C \to R}$; and (iv) audio output 809d from audio output device 802d to right ear 106a over a distance $d_{D \to R}$. The distances from longest to shortest are: (i) $d_{C \to L}$; (ii) $d_{D \to R}$; (iii) $d_{A \to L}$; and (iv) $d_{B \to R}$. The differences in respective distances of audio outputs 809a-d result in different sound intensities and timing from origination at electronic device 800 to termination at corresponding ear 106a-b. In particular, increased distance results in lower sound intensity and greater delay. Controller 101 adjusts audio outputs 809a-d to compensate for the distance-related changes to sound intensity and timing.

Figure 9:
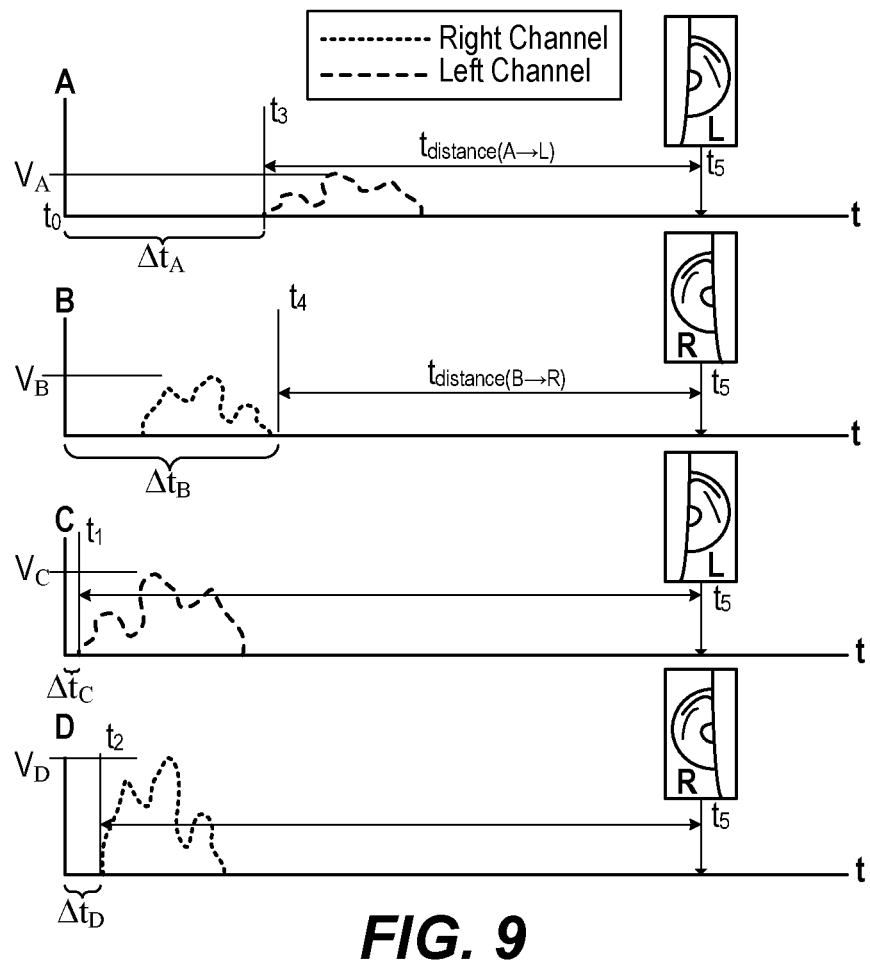
FIG. 9 is a composite graphical plot of adjusted audio for stereo sound produced by the electronic device of FIG. 8, according to one or more embodiments.

FIG. 9 depicts composite graphical plot 900 of four output plots 902a-d for stereo sound by electronic device 600 (FIG. 8). Each output plot 902a-d corresponds respectively to audio outputs 809a-d (FIG. 8) as adjusted by controller 101 (FIG. 8). Four output plots 702a-d depict audio adjustment of each audio output 809a-d (FIG. 8) that that are made to enhance audio quality/balance as perceived by person 104 (FIG. 8). Longer distances need a relatively higher sound intensity than a shorter distance. Shorter distances need a relatively longer delay than a longer distance. The audio adjustment includes time shifts and audio volume adjustments in relation to the different distances that the stereo sound travels to the person's ear. Output plot 902a represents audio output of left channel stereo from audio output device 602a to left ear 106a (FIG. 8) over a distance $d_{A \to L}$. Distance $d_{A \to L}$ is the third longest of the four audio output devices 602a-d (FIG. 8). The audio adjustment includes increasing audio volume ($V_B$) to the third highest level relative to the other three audio output devices 602b-d (FIG. 8) in relation to, and to compensate for, the distance $d_{A \to R}$. The audio adjustment includes delaying the audio output the third shortest amount to time $t_3$ relative to the other three audio output devices 602b-d (FIG. 8). The delay is to achieve simultaneous arrival at the person's ear. Output plot 902b represents audio output of right channel stereo from audio output device 602b to right ear 106a (FIG. 8) over a distance $d_{B \to R}$. Distance $d_{B \to R}$ is the shortest of the four. The audio adjustment includes increasing audio volume ($V_B$) to the lowest level relative to the other three audio output devices 602a, c, d (FIG. 8) in relation to, and to compensate for, the distance $d_{B \to R}$. The audio adjustment includes delaying the audio output the shortest amount to time $t_4$ relative to the other three audio output devices 602a, c, d (FIG. 8), which is the longest delay. Output plot 902c represents audio output of left channel stereo from audio output device 602c to left ear 106b (FIG. 8) over a distance $d_{C \to L}$. Distance $d_{C \to L}$ is the longest of the four audio output devices 602a-d (FIG. 8). The audio adjustment includes increasing audio volume ($V_C$) to the highest level relative to the other three audio output devices 602a, b, d (FIG. 8) in relation to, and to compensate for, the distance $d_{C \to L}$. The audio adjustment includes delaying the audio output the shortest amount to time $t_1$ relative to the other three audio output devices 602a, b, d (FIG. 8) because the distance is the longest. Output plot 902d represents audio output of right channel stereo from audio output device 602d to right ear 106b (FIG. 8) over a distance $d_{D \to R}$. Distance $d_{D \to R}$ is the second longest of the four audio output devices 602a-d (FIG. 8). The audio adjustment includes increasing audio volume (VD) to the second highest level relative to the other three audio output devices 602a-c (FIG. 8) in relation to, and to compensate for, the distance $d_{D \rightarrow R}$. The audio adjustment includes delaying the audio output the second longest amount to time $t_2$ relative to the other three audio output devices 602a-c (FIG. 8).

Figure 10:
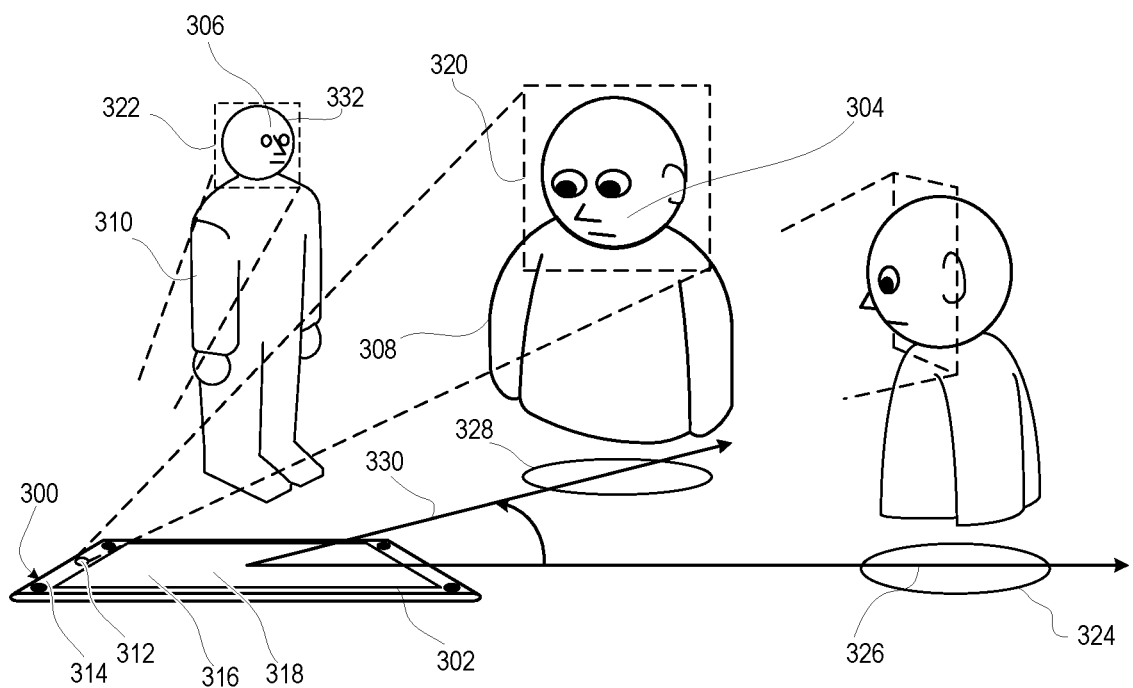
FIG. 10 is a three-dimensional side view an electronic device that adjusts audio for two of three active consumers based on proximity, according to one or more embodiments.

FIG. 10 depicts a three-dimensional side view of a scenario in which three people 104a-c are near electronic device 600, which is face up in a horizontal orientation. In support of audio adjustment, image capturing device 137 can have a field or view that includes faces that are not directly in front of electronic device 600. Facial recognition provides identified faces 1061a-c to controller 101 for audio adjustment of audio output devices 602a-d. In one or more embodiments, controller 101 associates one of identified faces 1061a-c with a user assigned to electronic device 600 and provides audio adjustment directed to the corresponding one of three persons 104a-c that is the assigned user. In one or more embodiments, more than one person is an assigned user of electronic device 600. When two or more assigned users are detected, electronic device 600 uses a prioritization scheme such as: (i) user with administrator privileges; (ii) closest user; (iii) last active user; etc. The prioritization scheme provides a methodology of how one user is selected for audio adjustment among more than one user.

Figure 11:
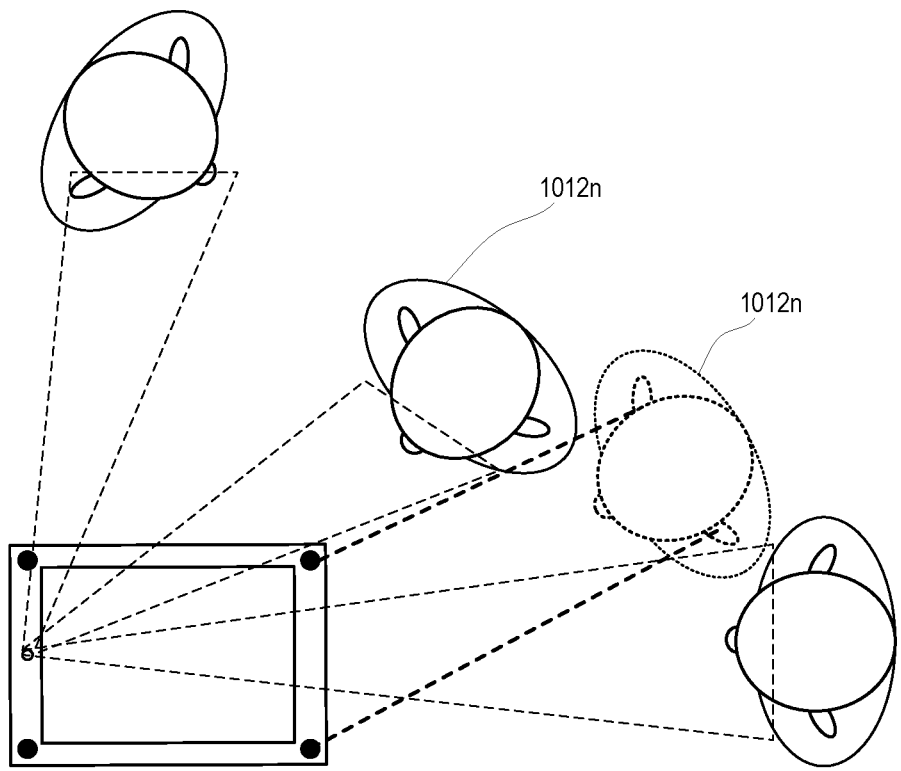
FIG. 11 is a top view of the electronic device that adjusts audio for two of three active consumers based on proximity, according to one or more embodiments.

FIG. 11 depicts a top view of the scenario in which three persons 104a-c are near electronic device 600, which is face up in a horizontal orientation. In one or more embodiments, controller 101 identifies the closest face and associates the closest one of identified faces 1061a-c for audio adjustment based on that face being closest to electronic device 600. In one or more embodiments, controller 101 associates more than one of identified faces 1061b-c for audio adjustment, based on a detection the selected faces being within pre-set threshold distance 1011. With these multi-consumer embodiments, controller 101 calculates coordinates in three-dimensional spatial domain of single generated face 1161 having facial features that are an averaged composite position of the selected more than one identified face 1061b-c. Controller 101 determines respective distances from audio output devices 602a-d to at least one of right and left ears 1106a-b of generated face 1161 based on a composite eye pointing direction assigned to generated face 1161. Controller 101 adjusts at least the respective acoustic output levels of audio output devices 602a-d in relation to the respective distances from audio output devices 602a-d to the at least one of right and left ears 1106a-b of generated face 1161 to compensate for a difference in the respective distances to the more than one person 1004b-c.

Figure 12A:
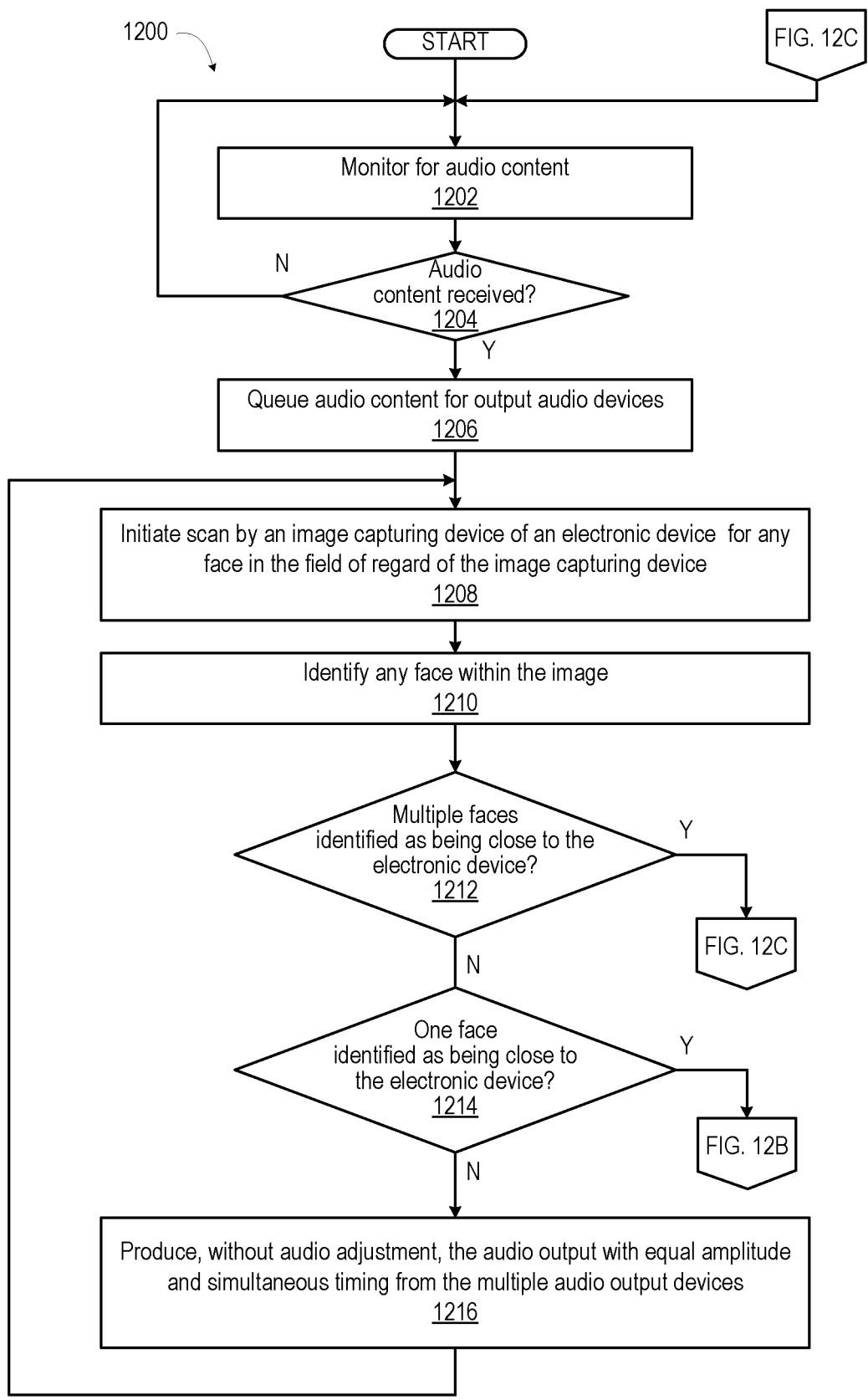
FIGS. 12A-12C present a flow diagram of a method for adjusting audio produced by multiple audio output devices of an electronic device, according to one or more embodiments.
Figure 12B:
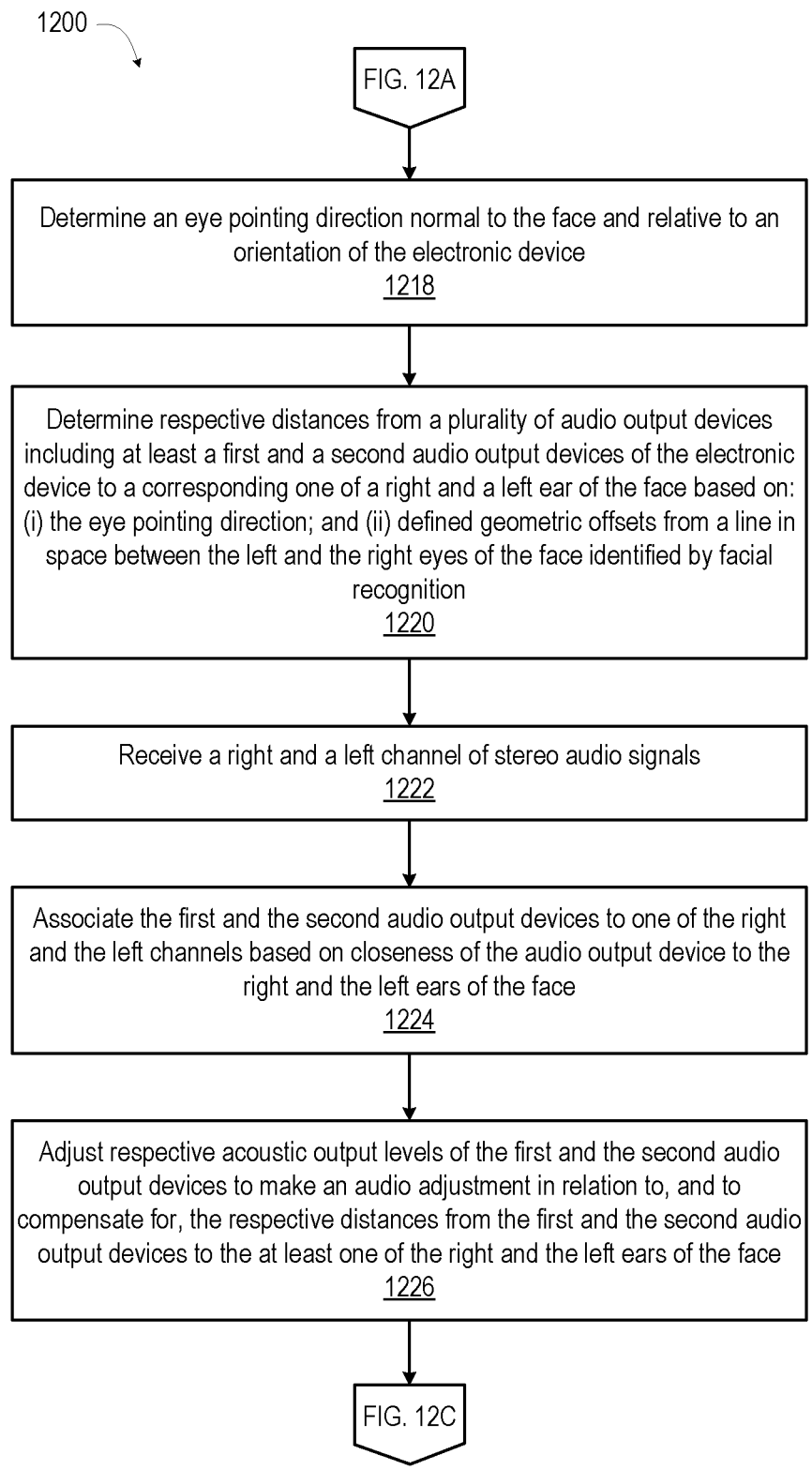
Figure 12C:
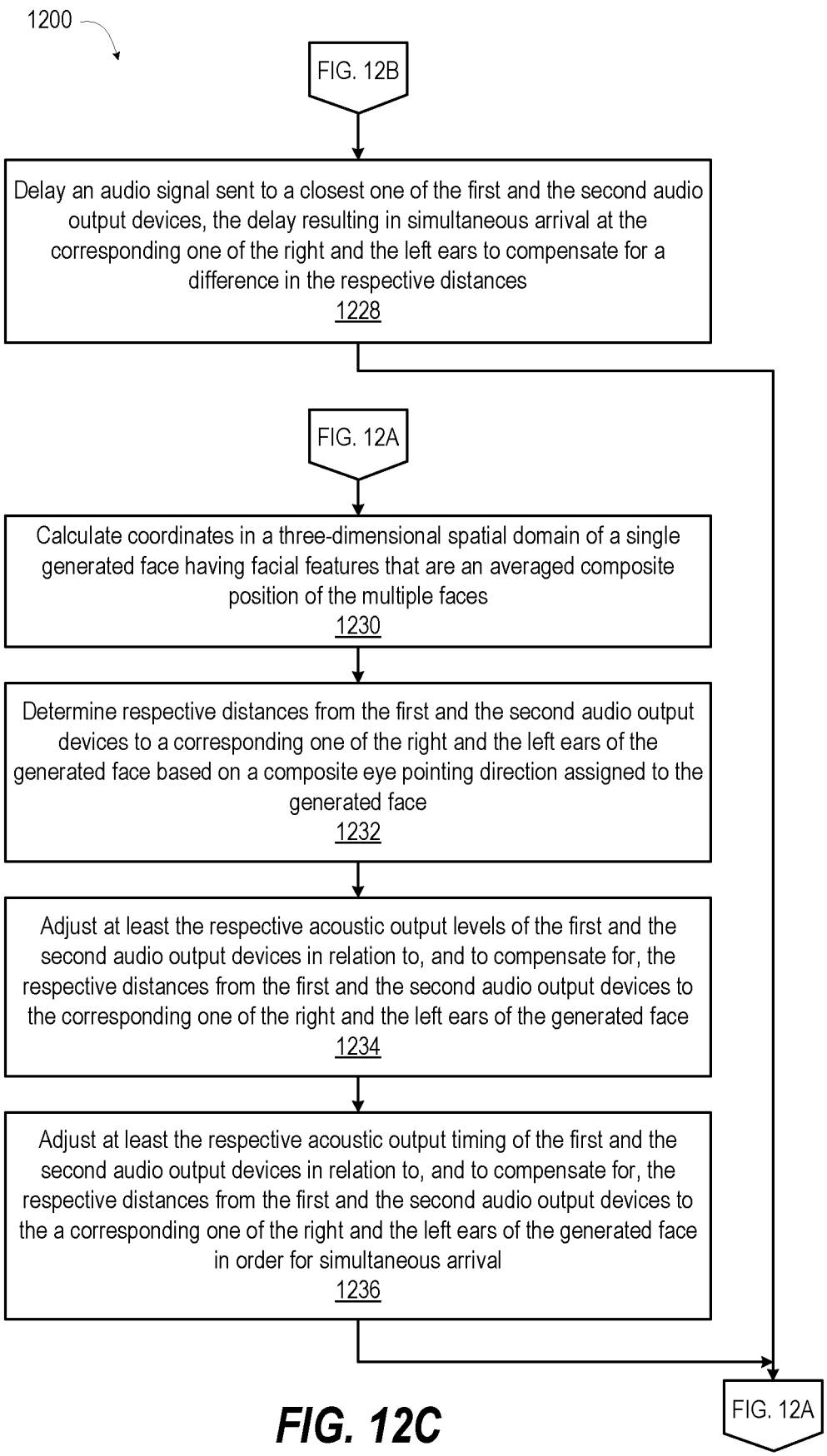

FIGS. 12A-12C depict a flow diagram of method 1200 for adjusting audio produced by multiple audio output devices 102a-b of electronic device 100 based on an orientation of a person to the electronic device 100 (FIG. 1). In one or more embodiments, controller 101 enables electronic device 100 (FIG. 1) to perform method 1200 by the execution of code such as audio adjustment application 153 and use of image capturing device 137 (FIG. 1) and other sensors to determine position of electronic device 100 (FIG. 1) position relative to the detected person(s). With initial reference to FIG. 12A, method 1200 includes monitoring for audio content (block 1202). Method 1200 includes determining, in decision block 1204, whether audio content is received. In response to not receiving audio content, method 1200 returns to block 1202. In response to receiving audio content, the audio content is queued for audio output devices (block 1206). Method 1200 includes initiating scan by an image capturing device of an electronic device for any face in the field of regard of the image capturing device (block 1208). Method 1200 includes identifying any face within the image (block 1210). A determination is made, in decision block 1212, whether multiple faces are identified as being close to the electronic device. For example, closeness can be based on a minimum required resolution of a facial recognition capability of electronic device 100 (FIG. 1). For another example, closeness can be based on being within a threshold range as determined by range finding or an estimate from the two-dimensional size in the image. In responses to determining that there are not multiple faces close to the electronic device, method 1200 includes determining, in decision block 1214, whether one face is identified as being close to the electronic device. In responses to determining that there is no face identified as being close to the electronic device, method 1200 includes producing, without audio adjustment, the audio output with equal amplitude and simultaneous timing from the multiple audio output devices (block 1216). Then method 1200 returns to block 1202.

Continuing with reference to FIG. 12B, in responses to determining (in decision block 1214 (FIG. 12A)) that one face is identified as being close to the electronic device, method 1200 includes determining an eye pointing direction normal to the face and relative to an orientation of the electronic device (block 1218). Method 1200 includes determining respective distances from a plurality of audio devices including at least a first and a second audio output devices of the electronic device to a corresponding one of a right and a left ear of the face based on: (i) the eye pointing direction; and (ii) defined geometric offsets from a line in space between the left and the right eyes of the face identified by facial recognition (block 1220). Method 1200 includes receiving a right and a left channel of stereo audio signals (block 1222). Method 1200 includes respectively associating the first and the second audio output devices to one of the right and the left channels based on closeness of the audio output device to the right and the left ears of the face (block 1224). Method 1200 includes adjusting respective acoustic output levels of the first and the second audio output devices to make an audio adjustment in relation to, and to compensate for, the respective distances from the first and the second audio output devices to the corresponding one of the right and the left ears of the face (block 1226).

Continuing with reference to FIG. 12C, method 1200 includes delaying an audio signal sent to a closest one of the first and the second audio output devices. The delay results in simultaneous arrival at the at least one of the right and the left ears to compensate for a difference in the respective distances (block 1228). Then method 1200 returns to block 1202.

In responses to determining that there are multiple faces close to the electronic device in decision block 1206 (FIG. 12A), method 1200 includes calculating coordinates in a three-dimensional spatial domain of a single generated face having facial features that are an averaged composite position of the multiple faces (block 1224). Method 1200 includes determining respective distances from the first and the second audio output devices to at least one of the right and the left ears of the generated face based on a composite eye pointing direction assigned to the generated face (block 1226). Method 1200 includes adjusting at least the respective acoustic output levels of the first and the second audio output devices in relation to, and to compensate for, the respective distances from the first and the second audio output devices to the a corresponding one of the right and the left ears of the generated face (block 1228). Method 1200 includes adjusting at least the respective acoustic output timing of the first and the second audio output devices in relation to, and to compensate for, the respective distances from the first and the second audio output devices to the a corresponding one of the right and the left ears of the generated face, and in order to achieve simultaneous arrival (block 1230). Then method 1200 returns to block 1202.

In each of the above flow charts presented herein, certain steps of the methods can be combined, performed simultaneously or in a different order, or perhaps omitted, without deviating from the spirit and scope of the described innovation. While the method steps are described and illustrated in a particular sequence, use of a specific sequence of steps is not meant to imply any limitations on the innovation. Changes may be made with regards to the sequence of steps without departing from the spirit or scope of the present innovation. Use of a particular sequence is therefore, not to be taken in a limiting sense, and the scope of the present innovation is defined only by the appended claims.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An electronic device comprising:
   first and second audio output devices that are spaced apart;
   an image capturing device that captures an image of at least a portion of a field of regard from a lens of the image capturing device;
   a memory containing an audio adjustment application; and
   a controller communicatively coupled to the first and the second audio output devices, the image capturing device, and the memory and that executes the audio adjustment application to enable the electronic device to:
   receive the image captured by the image capturing device;
   identify a face within the image;
   determine an eye pointing direction normal to the face and relative to an orientation of the electronic device;
   determine respective distances from the first and the second audio output devices to at least one of a right and a left ear of the face based on the eye pointing direction; and
   adjust respective acoustic output levels of the first and the second audio output devices to make an audio adjustment in relation to the respective distances from the first and the second audio output devices to the at least one of the right and the left ears of the face to compensate for a difference in the respective distances.

2. The electronic device of claim 1, wherein the controller enables the electronic device to:
   receive a right and a left channel of stereo audio signals; and
   respectively associate the first and the second audio output devices to one of the right and the left channels based on closeness to the right and the left ears of the face.

3. The electronic device of claim 1, wherein the controller enables the electronic device to delay an audio signal sent to a closest one of the first and the second audio output devices, the delay resulting in simultaneous arrival at the at least one of the right and the left ears to compensate for a difference in the respective distances.

4. The electronic device of claim 1, wherein the controller enables the electronic device to identify the face within the image by selecting, from among more than one face within the image, a first face that is closest to the electronic device.

5. The electronic device of claim 1, wherein the controller enables the electronic device to determine the distance to the right and the left ears of the face based in part on defined geometric offsets from a line in space between the left and the right eyes of the face identified by facial recognition.

6. The electronic device of claim 1, wherein the controller enables the electronic device to:
determine whether more than one face is detected facing toward the electronic device; and
in response to determining that more than one face is detect facing toward the electronic device:
convert facial features of the more than one face to coordinates in a three-dimensional spatial domain;
calculate coordinates in the three-dimensional spatial domain of a single generated face having facial features that are an averaged composite position of the more than one face;
determine respective distances from the first and the second audio output devices to at least one of the right and the left ears of the generated face based on a composite eye pointing direction assigned to the generated face; and
adjust at least the respective acoustic output levels of the first and the second audio output devices in relation to the respective distances from the first and the second audio output devices to the at least one of the right and the left ears of the generated face to compensate for a difference in the respective distances to the more than one face.

7. A method comprising:
receiving an image captured by an image capturing device of an electronic device;
identifying a face within the image;
determining an eye pointing direction normal to the face and relative to an orientation of the electronic device;
determining respective distances from a first and a second audio output devices of the electronic device to at least one of a right and a left ear of the face based on the eye pointing direction; and
adjusting respective acoustic output levels of the first and the second audio output devices to make an audio adjustment in relation to the respective distances from the first and the second audio output devices to the at least one of the right and the left ears of the face to compensate for a difference in the respective distances.

8. The method of claim 7, further comprising:
receiving a right and a left channel of stereo audio signals; and
respectively associating the first and the second audio output devices to one of the right and the left channels based on closeness to the right and the left ears of the face.

9. The method of claim 7, further comprising delaying an audio signal sent to a closest one of the first and the second audio output devices, the delay resulting in simultaneous arrival at the at least one of the right and the left ears to compensate for a difference in the respective distances.

10. The method of claim 7, further comprising identifying the face within the image by selecting, from among more than one face within the image, a first face that is closest to the electronic device.

11. The method of claim 7, wherein determining the distance to the right and the left ears of the face comprises determining positions of the left and the right ears based in part on defined geometric offsets from a line in space between the left and the right eyes of the face identified by facial recognition.

12. The method of claim 7, further comprising:
determining whether more than one face is detected facing toward the electronic device; and
in response to determining that more than one face is detect facing toward the electronic device:
converting facial features of the more than one face to coordinates in a three-dimensional spatial domain;
calculating coordinates in the three-dimensional spatial domain of a single generated face having facial features that are an averaged composite position of the more than one face;
determining respective distances from the first and the second audio output devices to at least one of the right and the left ears of the generated face based on a composite eye pointing direction assigned to the generated face; and
adjusting at least the respective acoustic output levels of the first and the second audio output devices in relation to the respective distances from the first and the second audio output devices to the at least one of the right and the left ears of the generated face to compensate for a difference in the respective distances to the more than one face.

13. A computer program product comprising:
a computer readable storage device; and
program code on the computer readable storage device that when executed by a processor associated with an electronic device having more than one spatially separated audio output devices and an image capturing device, the program code enables the electronic device to provide the functionality of:
receiving an image captured by an image capturing device of an electronic device;
identifying a face within the image;
determining an eye pointing direction normal to the face and relative to an orientation of the electronic device;
determining respective distances from first and the second audio output devices of the electronic device to at least one of a right and a left ear of the face based on the eye pointing direction; and
adjusting respective acoustic output levels of the first and the second audio output devices to make an audio adjustment in relation to the respective distances from the first and the second audio output devices to the at least one of the right and the left ears of the face to compensate for a difference in the respective distances.

14. The computer program product of claim 13, wherein the program code enables the electronic device to provide the functionality of:
receiving a right and a left channel of stereo audio signals; and
respectively associating the first and the second audio output devices to one of the right and the left channels based on closeness to the right and the left ears of the face.

15. The computer program product of claim 13, wherein the program code enables the electronic device to provide the functionality of delaying an audio signal sent to a closest one of the first and the second audio output devices, the delay resulting in simultaneous arrival at the at least one of the right and the left ears to compensate for a difference in the respective distances.

16. The computer program product of claim 13, wherein the program code enables the electronic device to provide the functionality of identifying the face within the image by selecting, from among more than one face within the image, a first face that is closest to the electronic device.

17. The computer program product of claim 13, wherein, in determining the distance to the right and the left ears of the face, the program code enables the electronic device to provide the functionality of determining positions of the left and the right ears based in part on defined geometric offsets from a line in space between the left and the right eyes of the face identified by facial recognition.

18. The computer program product of claim 13, wherein the program code enables the electronic device to provide the functionality of:
   determining whether more than one face is detected facing toward the electronic device; and
   in response to determining that more than one face is detect facing toward the electronic device:
      converting facial features of the more than one face to coordinates in a three-dimensional spatial domain;
      calculating coordinates in the three-dimensional spatial domain of a single generated face having facial features that are an averaged composite position of the more than one face;
      determining respective distances from the first and the second audio output devices to at least one of the right and the left ears of the generated face based on a composite eye pointing direction assigned to the generated face; and
      adjusting at least the respective acoustic output levels of the first and the second audio output devices in relation to the respective distances from the first and the second audio output devices to the at least one of the right and the left ears of the generated face to compensate for a difference in the respective distances to the more than one face.

* * * * *